United States Patent [19]
Ha

[11] Patent Number: 5,109,626
[45] Date of Patent: May 5, 1992

[54] ANIMAL TRAP

[76] Inventor: Muu P. Ha, 5713 Cardinals Guard Ave., Orlando, Fla. 32809

[21] Appl. No.: 650,021

[22] Filed: Feb. 4, 1991

[51] Int. Cl.$^5$ .............................................. A01M 23/30
[52] U.S. Cl. .......................................... 43/78; 43/79
[58] Field of Search ................................ 43/77, 78, 79

[56] References Cited

U.S. PATENT DOCUMENTS

| | | | |
|---|---|---|---|
| 27,967 | 4/1860 | Burton | 43/79 |
| 85,199 | 12/1868 | Beach | 43/79 |
| 97,755 | 12/1869 | Blume | 43/79 |
| 363,554 | 5/1887 | Sewel | 43/79 |
| 432,139 | 7/1890 | Kerns | 43/78 |
| 446,119 | 2/1891 | Smith | 43/78 |
| 983,181 | 1/1911 | Thorp | 43/79 |
| 995,493 | 6/1911 | Stephens | 43/79 |
| 1,147,822 | 7/1915 | Smith | 43/78 |
| 1,334,418 | 3/1920 | Tabor | 43/79 |
| 1,470,854 | 10/1923 | Lively | 43/79 |
| 1,527,328 | 2/1925 | Percich | 43/79 |
| 1,584,677 | 5/1926 | Stacy | 43/78 |
| 2,104,083 | 1/1938 | Krahl | 43/78 |
| 2,107,683 | 2/1938 | Williams | 43/78 |
| 2,542,942 | 2/1951 | Purlee | 43/78 |
| 4,685,245 | 8/1987 | LaPier | 43/78 |
| 4,858,373 | 8/1989 | Combs | 43/78 |

FOREIGN PATENT DOCUMENTS 1274610  5/1972  United Kingdom .................... 43/78

Primary Examiner—Kurt Rowan
Attorney, Agent, or Firm—William M. Hobby, III

[57] ABSTRACT

An animal trap apparatus has a frame having a base portion with an upright frame member extending generally perpendicular to the base and a top frame portion extending from the upright frame member over the base. A movable floor is attached to the frame base and has a protruding pin member. A slidable trap jaw is slidably attached to the frame over the base and movable floor and has a shaft extending therefrom and slidably mounted to the frame top frame portion. A pair of tension springs are connected between the top frame member and the slidable trap jaw so that raising the slidable jaw extends the spring. The cocking mechanism holds the jaw in a raised position against the spring tension of the extended springs and an actuating mechanism activates the cocking mechanism to release the jaw to propel the jaw towards the frame base and movable floor to entrap or impale an animal therebetween. The actuating mechanism includes a linkage between the jaw shaft and the movable floor to release the cocking mechanism and jaw responsive to a predetermined pressure on the movable floor so that an animal is trapped by stepping on the movable floor. The cocking mechanism has a cocking lever with a protruding cocking pin which swings into an opening in the jaw shaft and is held by the actuating mechanism linkage. A safety lock mechanism is pinned to the frame and swings a locked pin into a second opening in the upright shaft when the locking member is latched in that position.

6 Claims, 1 Drawing Sheet

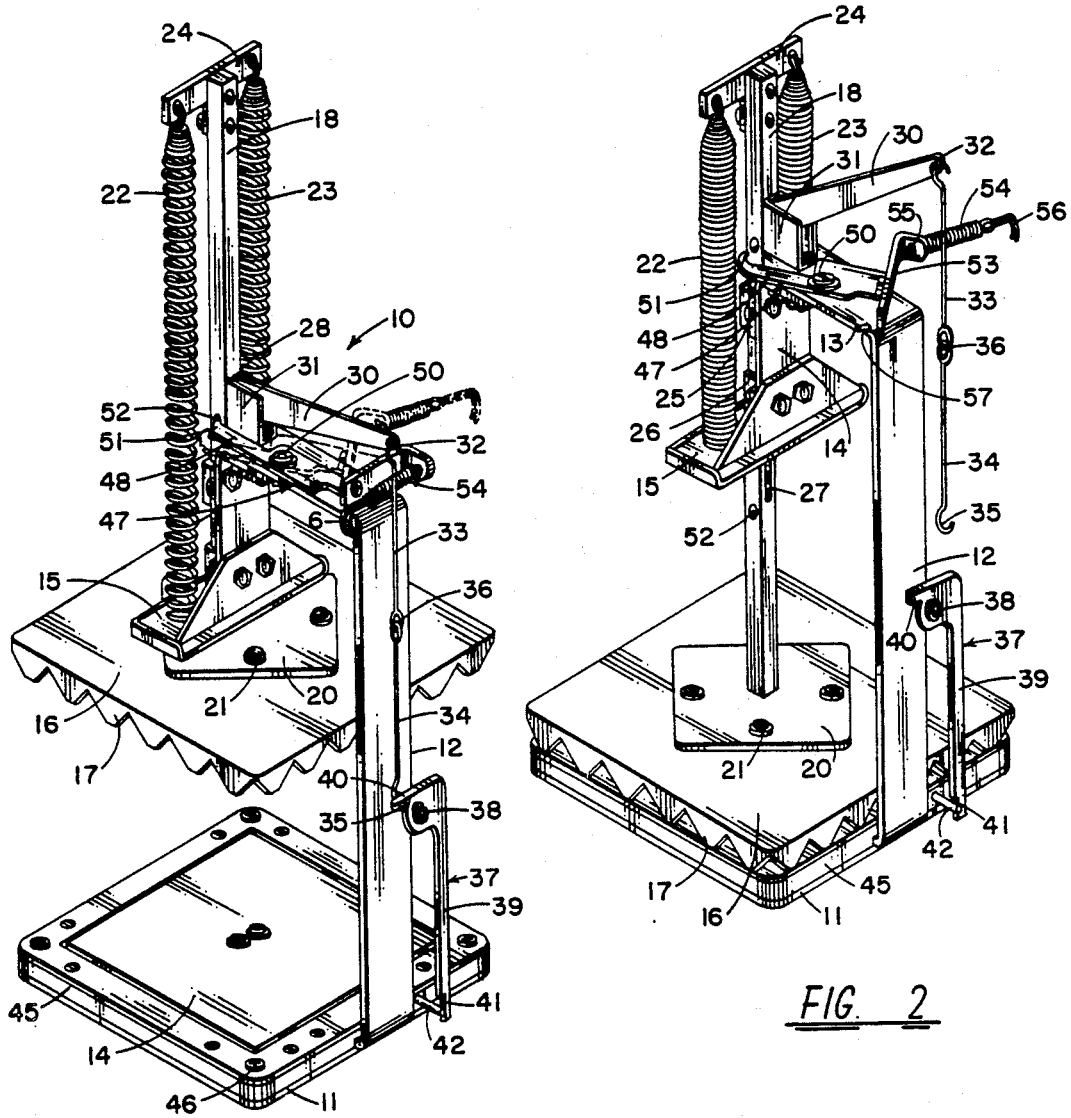
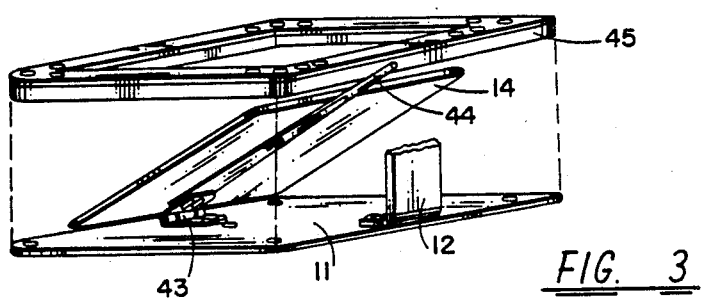

ANIMAL TRAP

BACKGROUND OF THE INVENTION

The present invention relates to an animal trap and especially to a rat trap which is activated by a rat stepping onto the floor of the trap.

In the past, there have been numerous animal trap designs. The most popular in recent times has been a spring wired bait trap which has bait attached to a trigger mechanism which activates a spring loaded wire trap arm to slam against the rat attempting to take the bait. This type of trap has inherent disadvantages and is unattractive and is limited in placement to out of the way areas not subject to accidental bumping, such as by children or pets. It also can be activated only by attracting the animal to the bait and the trap may be hazardous to an individual trying to set it by pulling the arm against the spring for latching the trap in a set position. In addition, the sensitivity of the trigger mechanism varies widely and is effected by wear.

The present invention provides for a vermin trap in which a spring-loaded jaw is impelled directly against a rat upon the rat attempting to pass across the floor so that the trap can be set in a place where rats tend to move along a wall or the like and can be activated without the use of bait.

Typical prior art animal traps of this type can be seen in the Tharp patent, No. 983,181, which has a pair of jaws, one of which is cocked by pulling it against a compression spring which is actuated by a trigger placed on the floor thereof. A second Tharp patent, No. 813,333, is for an animal trap which is similar to the first using a jaw set against a compression spring but is actuated by bait placed therein to attract the animal onto the floor of the trap. In an early rat trap by Cosolowsky, No. 109,112, the trap is actuated by a trigger pulling on a cord to release an overhead jaw. In a U.S. Pat. No. 85199 to Beach, a fish trap has a compression spring-loaded jaw extending over a bottom jaw for entrapping a fish therein. In the Franks animal trap, U.S. Pat. No. 928,649, an animal is impaled by a series of spikes on an upper jaw when the upper jaw is released by an animal attempting to take the bait placed in the trap. In the Nelson animal trap, U.S. Pat. No. 502,986, an overhead jaw type trap is released on an animal stepping on the floor which has a link running through the jaw to above the trap to release the upper jaw. In the LaPier patent, No. 4,685,245, a rodent trap has a raised jaw which is raised against a compression spring and is activated by a trigger mechanism to release the upper jaw to come down upon the rodent.

The present invention uses an upper jaw which is cocked against tension springs in a rat trap which will impel an upper jaw against the rat when released by stepping on the floor of the trap similar to some of the prior U.S. patents but has the improvement of an actuating mechanism which is reliable and which includes a safety locking mechanism to prevent accidental release of the entrapment jaws.

SUMMARY OF THE INVENTION

An animal trap apparatus has a frame having a base portion with an upright frame member extending generally perpendicular to the base and a top frame portion extending from the upright frame member over the base. A movable floor is attached to the frame base and has a protruding pin member. A slidable trap jaw is slidably attached to the frame over the base and movable floor and has a shaft extending therefrom and slidably mounted to the frame top frame portion. A pair of tension springs are connected between the top frame member and the slidable trap jaw so that raising the slidable jaw extends the spring. The cocking mechanism holds the jaw in a raised position against the spring tension of the extended springs and an actuating mechanism activates the cocking mechanism to release the jaw to propel the jaw towards the frame base and movable floor to entrap or impale an animal therebetween. The actuating mechanism includes a linkage between the jaw shaft and the movable floor to release the cocking mechanism and jaw responsive to a predetermined pressure on the movable floor so that an animal is trapped by stepping on the movable floor. The cocking mechanism has a cocking lever with a protruding cocking pin which swings into an opening in the jaw shaft and is held by the actuating mechanism linkage. A safety lock mechanism is pinned to the frame and swings a locked pin into a second opening in the upright shaft when the locking member is latched in that position.

BRIEF DESCRIPTION OF THE DRAWINGS

Other objects, features, and advantages of the present invention will be apparent from the written description and the drawings in which:

FIG. 1 is a perspective view of an animal trap in accordance with the present invention in a cocked position;

FIG. 2 is a perspective view of the animal trap in accordance with FIG. 1 in an actuated position; and FIG. 3 is an exploded partial perspective of the movable floor of the animal trap of FIGS. 1 and 2.

DESCRIPTION OF THE PREFERRED EMBODIMENT

Referring to FIGS. 1 through 3 of the drawings, a rat trap 10 is illustrated having a frame which includes a base 11, a generally perpendicular or vertical frame member 12 with a top frame member 13 extending over the base 11 and over a trap floor 14. The frame extension 13 has an additional frame portion 14 extending downward therefrom and has a spring attaching platform 15 attached thereto. A trap jaw 16 has a plurality of teeth 17 extending around the edge thereof and has a shaft 18 extending therefrom and attached with a flange 20 and fastener members 21 to the jaw 16. A pair of springs 22 and 23 are attached to the platform 15 and extend and attach to a spring supporting bar 24 attached to the top of the shaft 18. The shaft 18 rides through a guide opening in the platform 15 and has a pair of guide members 25 and 26 attached from the frame member 14 to guide the shaft 18 as it slides up and down carrying the jaw 14 with it.

When the trap is being cocked, the shaft 18 is pulled upward against the tension springs 22 and 23, as shown in FIG. 1, until a slot 27 in the shaft 18 aligns itself for the trigger arm 28 to slide thereinto for holding the shaft 18 in the raised position against the spring tension of the springs 22 and 23. The cocking arm 30, having the cocking end 28 thereon, rides in a yoke 31 attached to the frame member 13. The cocking arm 30 has an opening 32 therein and a first link 33 attached to the opening 32 at one end and attached to a second link 34 at the other end thereof. The link 34 has a hook end 35 on the opposite end thereof from the connecting joint 36 between the links 33 and 34. The trap release or cocking arm lever 37 is pinned at 38 to the frame member 12 and has a trigger pin 40 extending at one side for holding the hooks 35 therearound. An elongated arm 41 extends in an L-shape in a generally vertical direction and has a notch 41 on the end thereof. The notch engages a floor release pin 42.

The movable floor operation can be more clearly seen in FIG. 3 as the floor 14 hinged with a spring hinge 43 and having the floor release pin 44 extending therefrom. The hinge 43 is attached to the bottom of the floor 14 and is also attached to the base 11 of the trap which also has a base portion 44 extending around the periphery of the base portion 11 and is threadedly attached thereto with fasteners 44. Thus, the floor 14 is held in a raised position by the spring hinge 43 to push the pin 42 against the notched area 41 of the cocking lever 37 to hold the cocking lever in position with the pin 40 supporting the linkage 12 hook 35 thereover. The linkage in turn extends to hold the trigger arm 30 to hold the trigger portion 28 in the slot 27 to hold the shaft 18 in a raised position against the tension of the springs 22 and 23.

The trap is actuated by a rat or other rodent stepping on the floor 14 to push the floor in against the spring pressure of the spring hinge 43 to move the pin 42 downward to thereby release the rotating L-shaped arm 37 to thereby move the cocking pin 40 out of the way of the hook 35 to release the linkage 33 and 34 and the trigger arm 30 and trigger pin portion 28 to thereby release the shaft 18 against the tension springs 22 and 23 to drive the jaw 16 directly towards the floor 14 and base 11.

As a safety feature, a safety lock mechanism 47 has a locking arm 48 pinned with a pin 50 to the frame member 13 and having a locking pin 51 extending from one end and adapted to swing on the pin 50 into an aperture 52 in the shaft 18 when the shaft has been pulled into the cocked position, as shown in FIG. 1. Locking arm 48 has a perpendicular tab 53 on the opposite end thereof from the locking pin 51 and has a locking spring 54 held in an aperture 55 on the arm 53. The spring 54 has the latching end 56 from the opposite end thereof and can be clipped in a notch 57, as shown in FIG. 1, to lock the trap 10 against accidental firing until the trap is set into position at which time the locking arm 48 can be swung out of the way by releasing the spring 54 latching end 56 leaving the trap in a cocked position.

It should be clear at this point that a rodent or animal trap has been provided which can be used with or without bait by the placing of the trap in the runway for rats or the like and which is activated by the rats running across the trap. The trap is keyed to actuate in a sufficiently rapid manner to capture a rat running across the floor 14 and to immediately kill the rodent. The trap is made such that it can be fired with a minimum amount of pressure on the floor but is not actuated by any forces other than those directly placed on the floor and which has a safety mechanism to prevent the accidental firing when the trap is being placed in position. However, the present invention is not to be construed as limited to the forms shown which are to be considered illustrative rather than restrictive.

I claim:

1. An animal trap comprising:
   a frame having a base with an upright frame member extending generally perpendicular to said base and a top frame portion extending from said upright frame member over said base;
   a movable floor attached to said frame base, said floor having a release pin protruding therefrom;
   a slidable trap jaw slidably attached to said frame over said base and movable floor, said jaw having a shaft extending therefrom, said shaft being slidably mounted in said frame top frame portion;
   spring means having at least one tension spring connected between said top frame portion and said jaw shaft whereby raising said jaw shaft and jaw will extend said spring means;
   actuating means for releasing said cocked jaw to propel said jaw towards said frame base and to entrap an animal between said movable floor and said jaw, said actuating means having a linkage between said jaw shaft and said movable floor to release said jaw responsive to a predetermined pressure on said movable floor, whereby an animal is trapped by stepping on said movable floor, said actuating means having a cocking arm supported on said frame for holding said jaw in a raised position against the spring tension of said extended spring means; and
   a safety lock mechanism having a rotatable safety arm pinned to said frame top portion and having a safety lock pin on one end thereof, said safety arm rotatably to place said safety lock pin in an aperture in said shaft to lock said shaft in position.

2. An animal trap in accordance with claim 1 in which said safety lock mechanism rotatable safety arm has a spring attached to one end thereof and said spring has a latch end portion for latching to said frame upper portion.

3. An animal trap in accordance with claim 2 in which said shaft has a slot therein sized to accept said cocking arm.

4. An animal trap in accordance with claim 3 in which a linkage is connected between said cocking arm and said floor release pin.

5. An animal trap in accordance with claim 4 in which said linkage includes an L-shaped trigger pin rotatably pinned to said frame upright frame member and having a linkage release pin on one end thereof and a floor pin support on the other end thereof whereby pushing on said floor moves said floor pin to release said L-shaped trigger pin to thereby release said linkage and thereby release said cocking arm.

6. An animal trap in accordance with claim 8 in which said shaft has an aperture in the side thereof for receiving one end of said lock member for locking said shaft and jaw in firing position.

* * * * *